(12) United States Patent
Nakamura (10) Patent No.: US 8,704,126 B2
(45) Date of Patent: Apr. 22, 2014

(54) LASER BEAM MACHINING APPARATUS

(75) Inventor: Masaru Nakamura, Ota-Ku (JP)

(73) Assignee: Disco Corporation, Tokyo (JP)

( * ) Notice: Subject to any disclaimer, the term of this patent is extended or adjusted under 35 U.S.C. 154(b) by 1336 days.

(21) Appl. No.: 12/248,685

(22) Filed: Oct. 9, 2008

(65) Prior Publication Data

US 2009/0114627 A1    May 7, 2009

(30) Foreign Application Priority Data

Nov. 2, 2007 (JP) .................................. 2007-286032

(51) Int. Cl.
*B23K 26/00* (2006.01)
*B23K 26/06* (2006.01)

(52) U.S. Cl.
USPC ............ 219/121.68; 219/121.64; 219/121.65; 219/121.66; 219/121.67; 219/121.69; 219/121.71; 219/121.72

(58) Field of Classification Search
CPC ............... B23K 26/38; B23K 2201/40; B23K 26/0853; B23K 26/0042; B23K 26/0015
USPC ........... 219/121.65–121.82, 121.64; 264/400; 438/795
See application file for complete search history.

(56) References Cited

U.S. PATENT DOCUMENTS

| | | | | |
|---|---|---|---|---|
| 4,769,310 A | * | 9/1988 | Gugger et al. ................. | 430/346 |
| 4,932,989 A | * | 6/1990 | Presby ............................. | 65/387 |
| 4,959,275 A | * | 9/1990 | Iguchi et al. .................... | 428/603 |
| 5,072,091 A | * | 12/1991 | Nagata et al. ............ | 219/121.68 |
| 5,189,437 A | * | 2/1993 | Michaelis et al. .............. | 347/47 |
| 5,895,588 A | * | 4/1999 | Matsumura et al. ..... | 219/121.68 |
| 6,025,256 A | * | 2/2000 | Swenson et al. .............. | 438/601 |
| 6,418,154 B1 | * | 7/2002 | Kneip et al. ..................... | 372/25 |
| 6,603,095 B2 | * | 8/2003 | Hamann .................... | 219/121.7 |
| 6,642,476 B2 | * | 11/2003 | Hamann .................... | 219/121.7 |
| 6,683,276 B2 | * | 1/2004 | Mosavi .................... | 219/121.71 |
| 6,683,893 B2 | * | 1/2004 | Wang .............................. | 372/10 |
| 6,701,402 B1 | * | 3/2004 | Alexander et al. ............ | 710/305 |
| 6,831,936 B1 | * | 12/2004 | Smart ............................. | 372/26 |
| 6,931,035 B2 | * | 8/2005 | Wang .............................. | 372/10 |
| 6,973,104 B2 | * | 12/2005 | Smart ............................. | 372/13 |
| 7,057,259 B2 | * | 6/2006 | Arikado et al. ............... | 257/618 |

(Continued)

FOREIGN PATENT DOCUMENTS

JP    B2 3408805    9/2001

*Primary Examiner* — Dana Ross
*Assistant Examiner* — Brett Spurlock
(74) *Attorney, Agent, or Firm* — Greer Burns & Crain Ltd.

(57) ABSTRACT

A laser beam machining apparatus includes laser beam irradiation unit for irradiating a wafer held on a chuck table with a laser beam, and control unit. The laser beam irradiation unit includes a laser beam oscillator for oscillating a laser beam with such a wavelength as to be transmitted through said wafer, repetition frequency setting section for setting a repetition frequency of pulses in the laser beam oscillated from the laser beam oscillator. The control unit includes a memory for storing coordinates of an arcuate chamfer part formed at the outer periphery of the wafer and coordinates of a flat surface part surrounded by the chamfer part, and controls the repetition frequency setting section so as to set the repetition frequency of the pulses in the laser beam with which to irradiate the flat surface part to a value suitable for machining of the wafer and as to set the repetition frequency of the pulses in the laser beam with which to irradiate the chamfer part to a value higher than the repetition frequency in the pulses of the laser beam with which to irradiate the flat surface part.

4 Claims, 6 Drawing Sheets

(56) References Cited

U.S. PATENT DOCUMENTS

| | | | |
|---|---|---|---|
| 7,159,436 B2 * | 1/2007 | Joseph | 72/335 |
| 7,161,113 B2 * | 1/2007 | Horsting | 219/121.73 |
| 7,179,722 B2 * | 2/2007 | Murata et al. | 438/460 |
| 7,265,033 B2 * | 9/2007 | Shigematsu et al. | 438/463 |
| 7,446,022 B2 * | 11/2008 | Yoshikawa et al. | 438/463 |
| 7,460,566 B2 * | 12/2008 | Kennedy | 372/10 |
| 7,497,213 B2 * | 3/2009 | Nagai | 125/23.01 |
| 7,544,590 B2 * | 6/2009 | Watanabe | 438/463 |
| 7,630,421 B2 * | 12/2009 | Kobayashi et al. | 372/29.012 |
| 7,675,002 B2 * | 3/2010 | Nomaru et al. | 219/121.7 |
| 8,021,963 B2 * | 9/2011 | Sekiya | 438/459 |
| 2003/0003608 A1 * | 1/2003 | Arikado et al. | 438/14 |
| 2003/0081636 A1 * | 5/2003 | Wang | 372/10 |
| 2003/0111448 A1 * | 6/2003 | Mosavi | 219/121.71 |
| 2004/0097103 A1 * | 5/2004 | Imai et al. | 438/795 |
| 2004/0101002 A1 * | 5/2004 | Ukita et al. | 372/32 |
| 2004/0202207 A1 * | 10/2004 | Wang | 372/10 |
| 2005/0009307 A1 * | 1/2005 | Shigematsu et al. | 438/487 |
| 2005/0105568 A1 * | 5/2005 | Smart | 372/25 |
| 2005/0170613 A1 * | 8/2005 | Murata et al. | 438/460 |
| 2005/0170616 A1 * | 8/2005 | Murata et al. | 438/463 |
| 2005/0252894 A1 * | 11/2005 | Imai et al. | 219/121.78 |
| 2005/0265408 A1 * | 12/2005 | Lei et al. | 372/30 |
| 2005/0271095 A1 * | 12/2005 | Smart | 372/26 |
| 2006/0065640 A1 * | 3/2006 | Lizotte et al. | 219/121.61 |
| 2006/0079069 A1 * | 4/2006 | Nagai et al. | 438/455 |
| 2006/0087008 A1 * | 4/2006 | Nagai | 257/620 |
| 2006/0091126 A1 * | 5/2006 | Baird et al. | 219/121.72 |
| 2006/0094584 A1 * | 5/2006 | Shojiya et al. | 501/55 |
| 2006/0099774 A1 * | 5/2006 | Hoshino | 438/463 |
| 2006/0119691 A1 * | 6/2006 | Shigematsu et al. | 347/131 |
| 2006/0138106 A1 * | 6/2006 | Sun et al. | 219/121.69 |
| 2006/0138107 A1 * | 6/2006 | Sun et al. | 219/121.69 |
| 2006/0138108 A1 * | 6/2006 | Sun et al. | 219/121.69 |
| 2006/0153741 A1 * | 7/2006 | Yoshida | 422/100 |
| 2006/0201920 A1 * | 9/2006 | Morikazu et al. | 219/121.82 |
| 2006/0249488 A1 * | 11/2006 | Jurgensen | 219/121.68 |
| 2006/0249491 A1 * | 11/2006 | Jurgensen | 219/121.69 |
| 2006/0255023 A1 * | 11/2006 | Jurgensen | 219/121.69 |
| 2006/0279794 A1 * | 12/2006 | Jurgensen | 358/3.29 |
| 2007/0062920 A1 * | 3/2007 | Shin | 219/121.72 |
| 2007/0153842 A1 * | 7/2007 | Ukita et al. | 372/10 |
| 2007/0153843 A1 * | 7/2007 | Ukita et al. | 372/10 |
| 2007/0164073 A1 * | 7/2007 | Watanabe et al. | 225/96.5 |
| 2007/0228024 A1 * | 10/2007 | Bruland et al. | 219/121.69 |
| 2008/0188838 A1 * | 8/2008 | Abe | 606/4 |
| 2008/0217301 A1 * | 9/2008 | Nomaru et al. | 219/121.8 |

* cited by examiner

LASER BEAM MACHINING APPARATUS

BACKGROUND OF THE INVENTION

1. Field of the Invention

The present invention relates to a laser beam machining apparatus for performing laser beam machining along streets formed in a surface of a wafer held on a chuck table.

2. Description of the Related Art

In the semiconductor device manufacturing process, a plurality of regions are demarcated by planned dividing lines called streets arranged in a grid pattern in a surface of a substantially circular disk-shaped semiconductor wafer, and circuits such as ICs and LSIs are formed in the thus demarcated regions. Then, the regions with the circuits formed therein are divided by cutting the semiconductor wafer along the streets, to manufacture the individual semiconductor chips. Similarly, an optical device wafer in which a gallium nitride compound semiconductor and the like are laminated on a surface of a sapphire substrate is also cut along streets, to be divided into individual optical devices such as light emitting diodes and laser diodes, which are widely utilized for electric apparatuses.

In recent years, as a method for dividing a plate-shaped work such as a semiconductor wafer, a laser beam machining method has been attempted in which a pulsed laser beam capable of being transmitted through the work is used, and irradiation with the pulsed laser beam is conducted by adjusting the converging point in the inside of the regions to be divided. In a dividing method based on the use of this laser beam machining method, a work is irradiated from one side thereof with a pulsed laser beam having such a wavelength (for example, 1064 nm) as to be transmitted through the work while adjusting the converging point to the inside of the work, so as to continuously form a denatured layer in the inside of the work along the streets, and an external force is exerted along the streets where strength is lowered due to the formation of the denatured layer, thereby dividing the work (refer to, for example, Japanese Patent No. 3408805).

Meanwhile, an arcuate chamfer part is formed at the outer periphery of the wafer, and, at the time when the outer peripheral part provided with the chamfer part is irradiated with a laser beam, the converging point of the laser beam may coincide with the surface of the chamfer part. When the converging point of the laser beam thus coincides with the surface of the chamfer part, ablation machining may occur to generate debris, which would be deposited on the devices, thereby lowering the device quality. In addition, once the ablation machining occurs, the ablation machining tends to occur successively even if the converging point of the laser beam is positioned to the inside of the wafer.

SUMMARY OF THE INVENTION

Accordingly, it is an object of the present invention to provide a laser beam machining apparatus with which a denatured layer extending along streets can be formed in the inside of a wafer provided with a chamfer part at the outer periphery thereof, without causing ablation machining at the chamfer part.

In accordance with an aspect of the present invention, there is provided a laser beam machining apparatus including: a chuck table for holding a wafer; laser beam irradiation means for irradiating the wafer held on the chuck table with a laser beam; machining feeding means for putting the chuck table and the laser beam irradiation means into relative movement in a machining feed direction (X-axis direction); indexing feeding means for putting the chuck table and the laser beam irradiation means into relative movement in an indexing feed direction (Y-axis direction) orthogonal to the machining feed direction (X-axis direction); X-axis direction position detecting means for detecting the X-axis direction position of the chuck table; Y-axis direction position detecting means for detecting the Y-axis direction position of the chuck table; and control means for controlling the laser beam irradiation means, the machining feeding means and the indexing feeding means on the basis of signals from the X-axis direction position detecting means and the Y-axis direction position detecting means. The laser beam irradiation means includes a laser beam oscillator for oscillating a laser beam with such a wavelength as to be transmitted through the wafer, repetition frequency setting means for setting a repetition frequency of pulses in the laser beam oscillated from the laser beam oscillator, and a Q switch for outputting a gate signal to the laser beam oscillator correspondingly to the repetition frequency set by the repetition frequency setting means. The control means includes a memory for storing coordinates of an arcuate chamfer part formed at an outer periphery of the wafer and coordinates of a flat surface part surrounded by the chamfer part, and controls the repetition frequency setting means so as to set a repetition frequency of pulses in a laser beam with which to irradiate the flat surface part to a value suitable for machining of the wafer, and as to set a repetition frequency of pulses in a laser beam with which to irradiate the chamfer part to a value higher than the repetition frequency of the pulses in the laser beam with which to irradiate the flat surface part.

In accordance with another aspect of the present invention, there is provided a laser beam machining apparatus including: a chuck table for holding a wafer; laser beam irradiation means for irradiating the wafer held on the chuck table with a laser beam; machining feeding means for putting the chuck table and the laser beam irradiation means into relative movement in a machining feed direction (X-axis direction); indexing feeding means for putting the chuck table and the laser beam irradiation means into relative movement in an indexing feed direction (Y-axis direction) orthogonal to the machining feed direction (X-axis direction); X-axis direction position detecting means for detecting the X-axis direction position of the chuck table; Y-axis direction position detecting means for detecting the Y-axis direction position of the chuck table; and control means for controlling the laser beam irradiation means, the machining feeding means and the indexing feeding means on the basis of signals from the X-axis direction position detecting means and the Y-axis direction position detecting means. The laser beam irradiation means includes: a laser beam oscillator for oscillating a laser beam with such a wavelength as to be transmitted through the wafer, repetition frequency setting means for setting a repetition frequency of pulses in the laser beam oscillated from the laser beam oscillator, and a Q switch for outputting a gate signal to the laser beam oscillator correspondingly to the repetition frequency set by the repetition frequency setting means. The control means includes a memory for storing coordinates of an arcuate chamfer part formed at an outer periphery of the wafer and coordinates of a flat surface part surrounded by the chamfer part, controls the repetition frequency setting means so as to set a repetition frequency of pulses in a laser beam with which to irradiate the flat surface part to a value suitable for machining of the wafer, and opens the Q switch to cause the laser beam oscillated from the laser beam oscillator to be a continuous wave at the time of irradiating the chamber part the said laser beam.

In the laser beam machining apparatus based on the present invention, the frequency of pulses in the laser beam with which to irradiate the flat surface part of the wafer is set to a value suitable for machining of the wafer, so that a denatured layer can be formed in the inside of the wafer along the streets. In this case, since the repetition frequency of pulses in the laser beam with which to irradiate the chamfer part is set to a value higher than the repetition frequency of pulses in the laser beam with which to irradiate the flat surface part, the former pulsed laser beam is low in energy density per pulse, so that the wafer is not machined at the chamfer part. Therefore, even if the converging point of the laser beam radiated from the laser beam irradiation means is positioned into the vicinity of the surface of the chamfer part, the part would not undergo ablation machining and, hence, no debris would be generated.

Besides, in the laser beam machining apparatus based on the present invention, the frequency of pulses in the laser beam with which to irradiate the flat surface part of the wafer is set to a value suitable for machining of the wafer, a denatured layer can be formed in the inside of the wafer along the streets. In this case, since the Q switch is opened and the laser beam oscillated from the laser beam oscillator is made to be a continuous wave at the time of irradiating the chamfer part with the laser beam, the energy density is low and, hence, the wafer is not machined. Therefore, even if the converging point of the laser beam radiated from the laser beam irradiation means is positioned into the vicinity of the surface of the chamfer part, the wafer would not undergo ablation machining and, hence, no debris would be generated.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
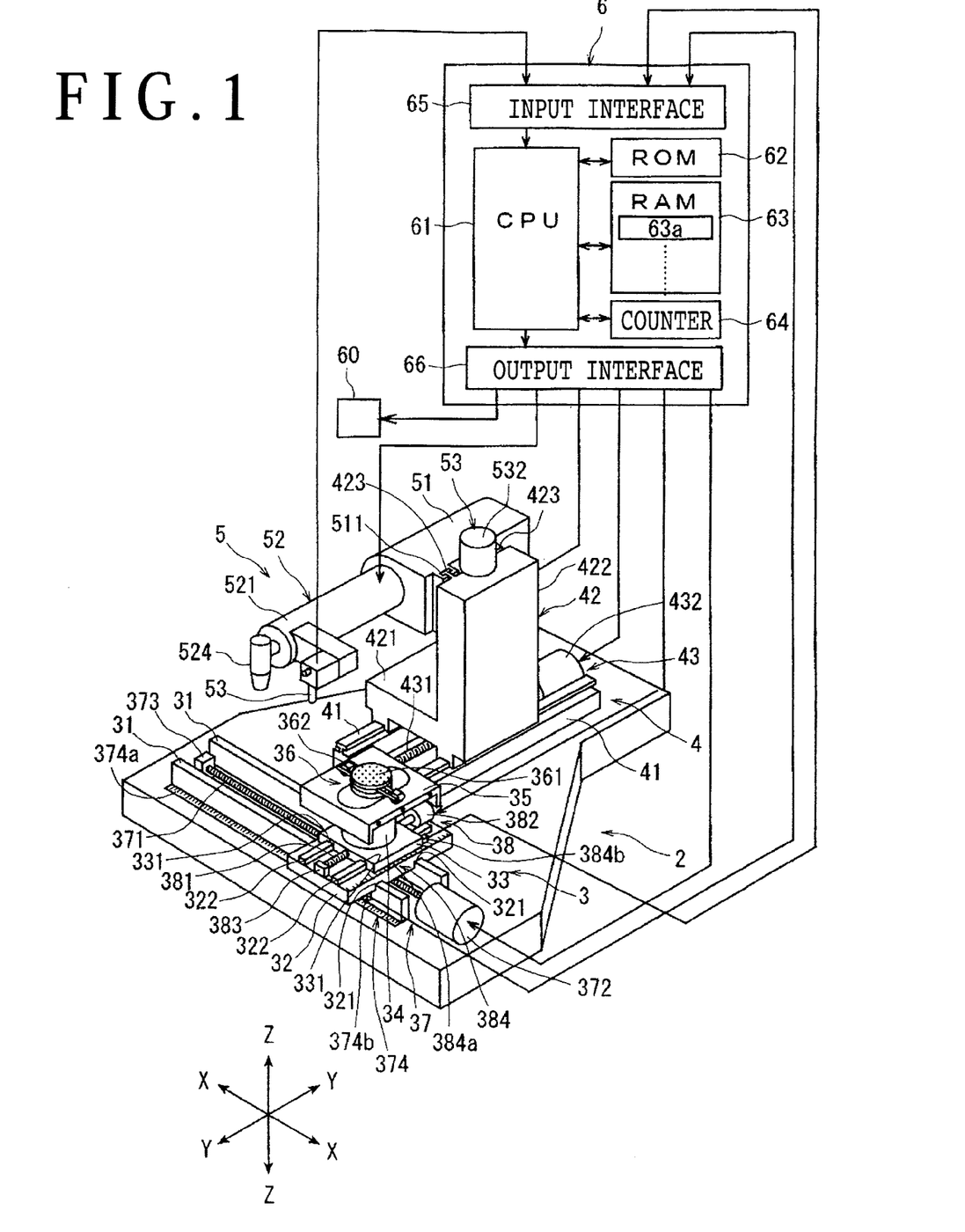
FIG. 1 is a perspective view of a laser beam machining apparatus configured based on the present invention.

Now, a preferred embodiment of a laser beam machining apparatus configured based on the present invention will be described more in detail below, referring to the attached drawings. FIG. 1 shows a perspective view of the laser beam machining apparatus configured based on the present invention. The laser beam machining apparatus shown in FIG. 1 includes a stationary base 2, a chuck table mechanism 3 which is disposed on the stationary base 2 so as to be movable in a machining feed direction indicated by arrows X (X-axis direction) and which holds a work, a laser beam irradiation unit support mechanism 4 disposed on the stationary base 2 so as to be movable in an indexing feed direction indicated by arrows Y (Y-axis direction) perpendicular to the direction indicated by arrows X (X-axis direction), and a laser beam irradiation unit 5 disposed on the laser beam irradiation unit support mechanism 4 so as to be movable in a direction indicated by arrows Z (Z-axis direction).

The chuck table mechanism 3 includes a pair of guide rails 31, 31 disposed on the stationary base 2 in parallel to each other along the machining feeding direction indicated by arrows X (X-axis direction), a first slide block 32 disposed on the guide rails 31, 31 so as to be movable in the machining feed direction indicated by arrows X (X-axis direction), a second slide block 33 disposed on the first slide block 32 so as to be movable in the indexing feed direction indicated by arrows Y (Y-axis direction), a cover table 35 supported on the second slide block 33 by a cylindrical member 34, and a chuck table 36 as work holding means. The chuck table 36 has a suction chuck 361 formed from a porous material, and is so configured that, for example, a circular disk-shaped semiconductor wafer as a work is held on the suction chuck 361 by suction means (not shown). The chuck table 36 thus configured is rotated by a pulse motor (not shown) disposed inside the cylindrical member 34. Incidentally, the chuck table 36 is fitted with clamps 362 for fixing an annular frame which will be described later.

The first slide block 32 is provided in its lower surface with a pair of guided grooves 321, 321 in which to fit the pair of guide rails 31, 31, and is provided on its upper surface with a pair of guide rails 322, 322 formed in parallel to each other along the indexing feed direction indicated by arrows Y (Y-axis direction). The first slide block 32 thus configured, with its guided grooves 321, 321 fitted over the pair of guide rails 31, 31, can be moved in the machining feed direction indicated by arrows X (X-axis direction) along the pair of guide rails 31, 31. The chuck table mechanism 3 in the embodiment shown has machining feeding means 37 by which the first slide block 32 is moved in the machining feed direction indicated by arrows X (X-axis direction) along the pair of guide rails 31, 31. The machining feeding means 37 includes a male screw rod 371 disposed between and in parallel to the pair of guide rails 31, 31, and a drive source such as a pulse motor 372 for driving the male screw rod 371 to rotate. The male screw rod 371 has its one end rotatably supported by a bearing block 373 fixed to the stationary base 2, and has its other end connected to an output shaft of the pulse motor 372 in a motive power-transmitting manner. Incidentally, the male screw rod 371 is in screw engagement with a penetrating female screw hole formed in a female screw block (not shown) projectingly provided on a lower surface of a central part of the first slide block 32. Therefore, with the male screw rod 371 driven to rotate normally and reversely by the pulse motor 372, the first slide block 32 is moved in the machining feed direction indicated by arrows X (X-axis direction) along the guide rails 31, 31.

The laser beam machining apparatus in the embodiment shown has X-axis direction position detecting means 374 for detecting the machining feed amount, or the X-axis direction position, of the chuck table 36. The X-axis direction position detecting means 374 includes a linear scale 374a disposed along the guide rail 31, and a reading head 374b which is disposed on the first slide block 32 and which is moved along the linear scale 374a together with the first slide block 32. The reading head 374*b* of the X-axis direction position detecting means 374, in the embodiment shown, sends to control means (described later) a pulse signal containing one pulse per 1 μm feed. Then, the control means (described later) counts the pulses contained in the pulse signal inputted thereto, to thereby detect the machining feed amount, or the X-axis direction position, of the chuck table 36. Incidentally, in the case where the pulse motor 372 is used as the drive source for the machining feeding means 37, the machining feed amount, or the X-axis direction position, of the chuck table 36 can be detected also by counting drive pulses in the control means (described later) which outputs a driving signal to the pulse motor 372. In addition, in the case where a servo motor is used as the drive source for the machining feeding means 37, the machining feed amount, or the X-axis direction position, of the chuck table 36 can be detected also by a method in which a pulse signal outputted from a rotary encoder for detecting the number of revolutions (or rotating speed) of the servo motor is sent to the control means (described later), and the control means counts the pulses contained in the pulse signal inputted thereto.

The second slide block 33 is provided in its lower surface with a pair of guided grooves 331, 331 in which to fit the pair of guide rails 322, 322 provided on the upper surface of the first slide block 32, and is so configured that, with its guided grooves 331, 331 fitted over the pair of guide rails 322, 322, it can be moved in the indexing feed direction indicated by arrows Y (Y-axis direction). The chuck table mechanism 3 in the embodiment shown has first indexing feeding means 38 by which the second slide block 33 is moved in the indexing feed direction indicated by arrows Y (Y-axis direction) along the pair of guide rails 322, 322 provided on the first slide block 32. The first indexing feeding means 38 includes a male screw rod 381 disposed between and in parallel to the pair of guide rails 322, 322, and a drive source such as a pulse motor 382 for driving the male screw rod 381 to rotate. The male screw rod 381 has its one end rotatably supported by a bearing block 383 fixed to the upper surface of the first slide block 32, and has its other end connected to an output shaft of the pulse motor 382 in a motive power-transmitting manner. Incidentally, the male screw rod 381 is in screw engagement with a penetrating female screw hole formed in a female screw block (not shown) projectingly provided at a lower surface of a central part of the second slide block 33. Therefore, with the male screw rod 381 driven to rotate normally and reversely by the pulse motor 382, the second slide block 33 is moved in the indexing feed direction indicated by arrows Y (Y-axis direction) along the guide rails 322, 322.

The laser beam machining apparatus in the embodiment shown has Y-axis direction position detecting means 384 for detecting the indexing feed amount, or the Y-axis direction position, of the second slide block 33. The Y-axis direction position detecting means 384 includes a linear scale 384*a* disposed along the guide rail 322, and a reading head 384*b* which is disposed on the second slide block 33 and which is moved along the linear scale 384*a* together with the second slide block 33. The reading head 384*b* of the Y-axis direction position detecting means 384, in the embodiment shown, sends to the control means (described later) a pulse signal containing one pulse per 1 μm feed. Then, the control means (described later) counts the pulses contained in the pulse signal inputted thereto, thereby to detect the indexing feed amount, or the Y-axis direction position, of the chuck table 36. Incidentally, in the case where the pulse motor 382 is used as the drive source for the indexing feeding means 38, the indexing feed amount, or the Y-axis direction position, of the chuck table 36 can be detected also by counting drive pulses in the control means (described later) which outputs a driving signal to the pulse motor 382. Besides, in the case where a servo motor is used as the drive source for the first indexing feeding means 38, the indexing feed amount, or the Y-axis direction position, of the chuck table 36 can be detected also by a method in which a pulse signal outputted from a rotary encoder for detecting the number of revolutions (rotating speed) of the servo motor is sent to the control means (described later), and the control means counts the pulses contained in the pulse signal inputted thereto.

The laser beam irradiation unit support mechanism 4 includes a pair of guide rails 41, 41 disposed on the stationary base 2 in parallel to each other along the indexing feed direction indicated by arrows Y (Y-axis direction), and a movable support base 42 disposed on the guide rails 41, 41 so as to be movable in the direction indicated by arrows Y. The movable support base 42 includes a moving support part 421 movably disposed on the guide rails 41, 41, and a mounting part 422 mounted to the movable support part 421. The mounting part 422 is provided on its one side surface with a pair of guide rails 423, 423 extending in parallel to each other along the direction indicated by arrows Z (Z-axis direction). The laser beam irradiation unit support mechanism 4 in the embodiment shown has second indexing feeding means 43 by which the movable support base 42 is moved in the indexing feed direction indicated by arrows Y (Y-axis direction) along the pair of guide rails 41, 41. The second indexing feeding means 43 includes a male screw rod 431 disposed between and in parallel to the pair of guide rails 41, 41, and a drive source such as a pulse motor 432 for driving the male screw rod 431 to rotate. The male screw rod 431 has its one end rotatably supported by a bearing block (not shown) fixed to the stationary base 2, and has its other end connected to an output shaft of the pulse motor 432 in a motive power-transmitting manner. Incidentally, the male screw rod 431 is in screw engagement with a female screw hole formed in a female screw block (not shown) projectingly provided at a lower surface of a central part of the moving support part 421 constituting the movable support base 42. Therefore, with the male screw rod 431 driven to rotate normally and reversely by the pulse motor 432, the movable support base 42 is moved in the indexing feed direction indicated by arrows Y (Y-axis direction) along the guide rails 41, 41.

The laser beam irradiation unit 5 includes a unit holder 51, and laser beam irradiation means 52 attached to the unit holder 51. The unit holder 51 is provided with a pair of guided grooves 511, 511 in which to slidably fit the pair of guide rails 423, 423 provided on the mounting part 422, and, with its guided grooves 511, 511 in engagement with the guide rails 423, 423, it is supported so as to be movable in the direction indicated by arrows Z (Z-axis direction).

The laser beam irradiation unit 5 has converging point position adjusting means 53 for moving the unit holder 51 in the direction indicated by arrows Z (Z-axis direction) along the pair of guide rails 423, 423. The converging point position adjusting means 53 includes a male screw rod (not shown) disposed between the pair of guide rails 423, 423, and a drive source such as a pulse motor 532 for driving the male screw rod to rotate, and moves the unit holder 51 and the laser beam irradiation means 52 in the direction indicated by arrows Z (Z-axis direction) along the guide rails 423, 423 by driving the male screw rod (not shown) to rotate normally and reversely by the pulse motor 532. Incidentally, in the embodiment shown, with the pulse motor 532 driven to rotate normally, the laser beam irradiation means 52 is moved upwards, and, with the pulse motor 532 driven to rotate reversely, the laser beam irradiation means 52 is moved downwards.

Figure 2:
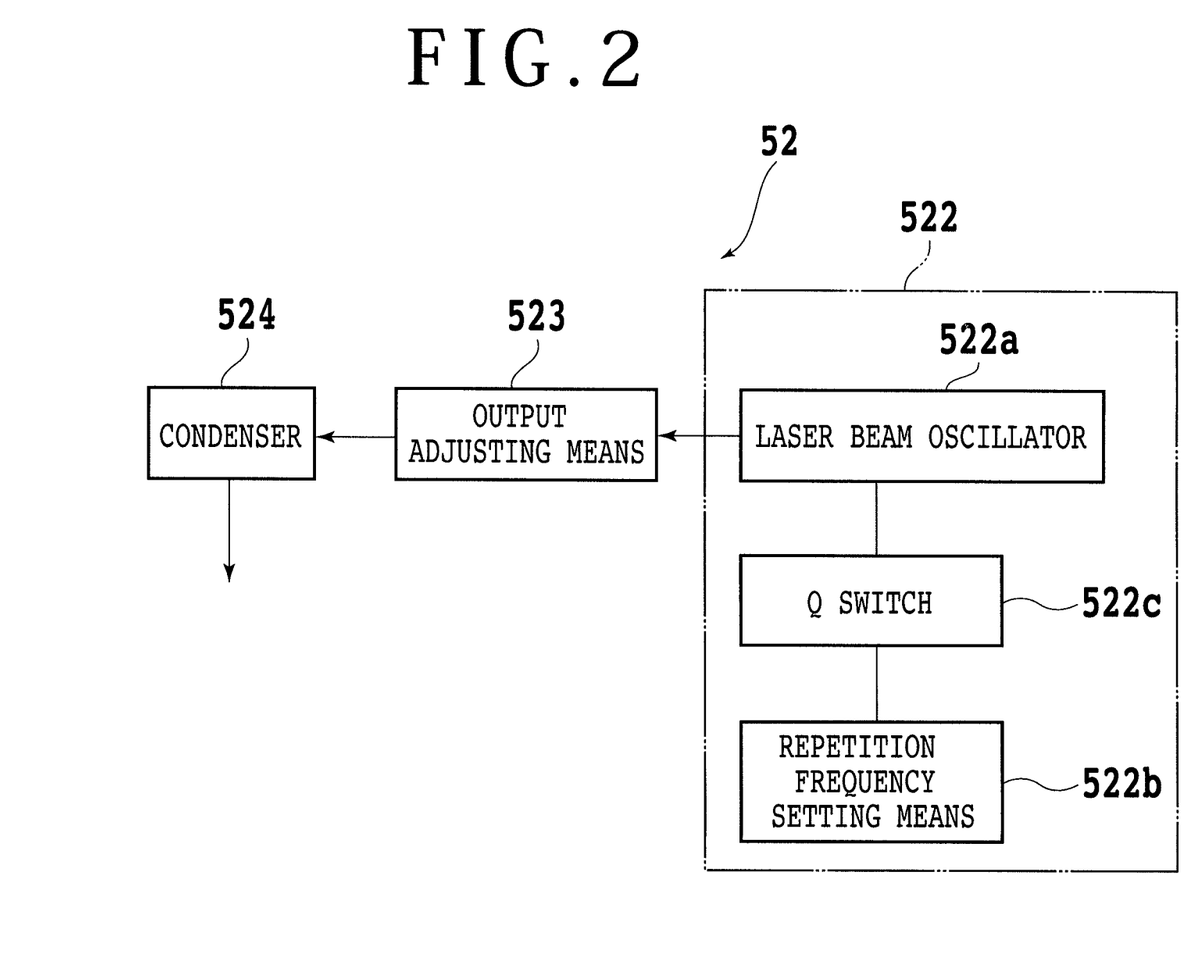
FIG. 2 is a block diagram schematically illustrating the configuration of laser beam irradiation means provided in the laser beam machining apparatus shown in FIG. 1.

The laser beam irradiation means 52 includes a cylindrical casing 521 disposed substantially horizontally. In addition, as shown in FIG. 2, the laser beam irradiation means 52 includes laser beam oscillating means 522 and output adjusting means 523, which are disposed inside the casing 521, and a condenser 524 which is disposed at the tip of the casing 521 by which a laser beam oscillated from the laser beam oscillating means 522 is radiated to a work held on the chuck table 36. The laser beam oscillating means 522 includes a laser beam oscillator 522a composed of a YAG laser oscillator or a YVO4 laser oscillator, repetition frequency setting means 522b for setting a repetition frequency of pulses in the laser beam oscillated from the laser beam oscillator 522a, and a Q switch 522c for outputting a gate signal to the laser beam oscillator 522a correspondingly to the repetition frequency set by the repetition frequency setting means 522b, and these components are controlled by the control means (described later). The output adjusting means 523 adjusts the output of the laser beam oscillated from the laser beam oscillating means 522.

Continuing description by returning to FIG. 1, the laser beam machining apparatus in the embodiment shown has image pickup means 53 which is disposed at a front end part of the casing 521 and which picks up an image of a work area to be subjected to laser beam machining by the laser beam irradiation means 52. The image pickup means 53 includes not only an ordinary image pickup device (CCD) for picking up image by use of visible rays but also infrared illumination means for illuminating the work with infrared (IR) rays, an optical system for catching the IR rays radiated by the infrared illumination means, an image pickup device (infrared CCD) for outputting an electrical signal corresponding to the infrared rays caught by the optical system, etc., and sends a picture signal obtained by image pickup to the control means (described later).

The laser beam machining apparatus further includes the control means 6. The control means 6, configured by use of a computer, includes a central processor unit (CPU) 61 for performing arithmetic operations according to a control program, a read only memory (ROM) 62 for storing the control program and the like, a readable/writable random access memory (RAM) 63 for storing a control map (described later), design value data on the work, the results of arithmetic operations, etc., a counter 64, an input interface 65 and an output interface 66. Detection signals from the X-axis direction position detecting means 374, the Y-axis direction position detecting means 384, the image pickup means 53 and the like are inputted to the input interface 65 of the control means 6. Then, control signals are outputted from the output interface 66 of the control means 6 to the pulse motor 372, the pulse motor 382, the pulse motor 432, the pulse motor 532, the laser beam irradiation means 52, a display 60, etc. Incidentally, the random access memory (RAM) 63 has a first storage region 63a for storing design value data on the work (which will be described later) and other storage regions.

Figure 3:
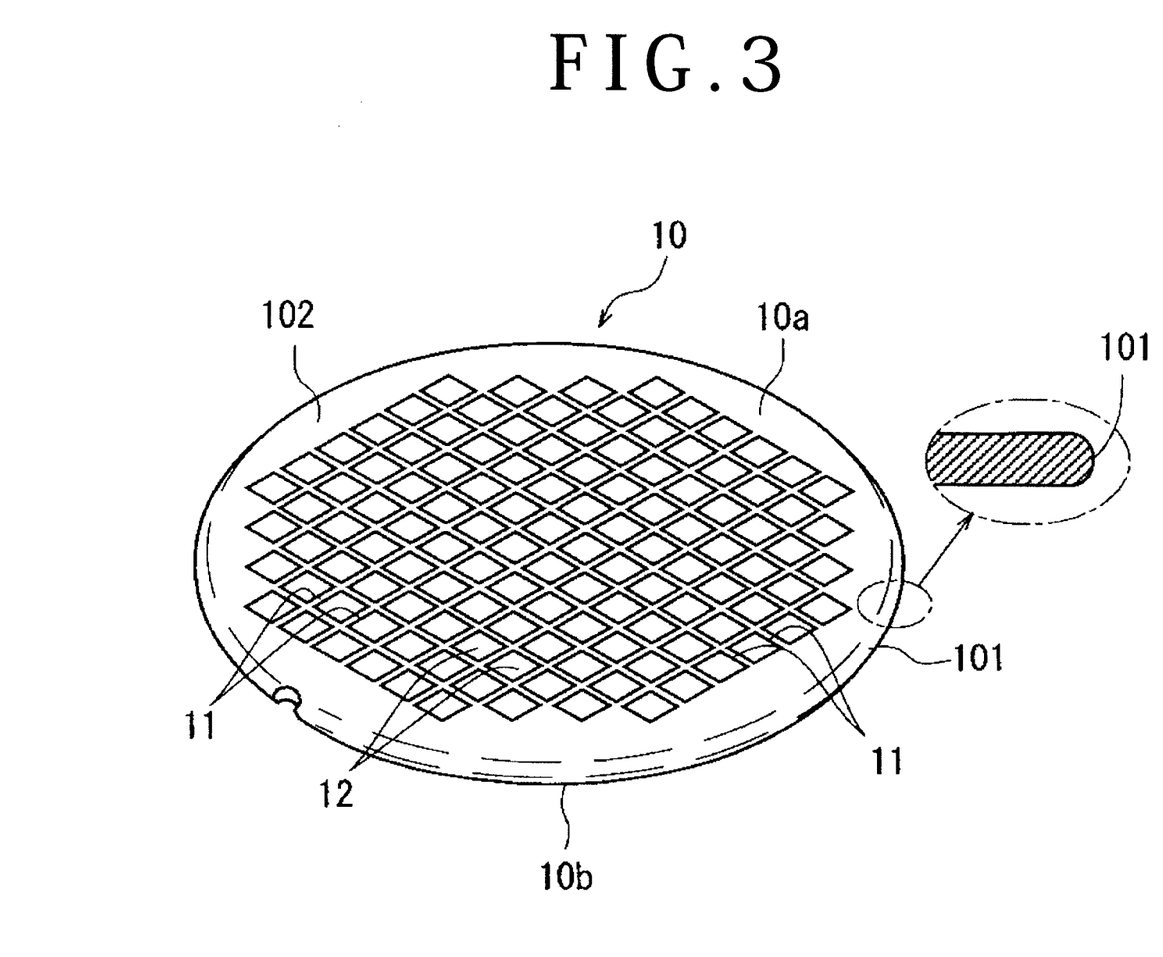
FIG. 3 is a perspective view of a semiconductor wafer as a wafer to be machined by the laser beam machining apparatus shown in FIG. 1.

The laser beam machining apparatus in the embodiment shown is configured as above-described, and it operates as follows. FIG. 3 shows a plan view of a semiconductor wafer 10 as a work to be subjected to laser beam machining. The semiconductor wafer 10 shown in FIG. 3 is composed, for example, of a 100 μm-thick silicon wafer, with an arcuate chamfer part 101 formed at the outer periphery thereof. The semiconductor wafer 10 with its outer periphery thus chamfered has a plurality of regions demarcated by a plurality of streets 11 formed in a grid pattern in that flat surface part 102 of the face-side surface 10a which is surrounded by the chamfer part 101, and devices 12 such as ICs and LSIs are formed in the plurality of regions.

Figure 4:
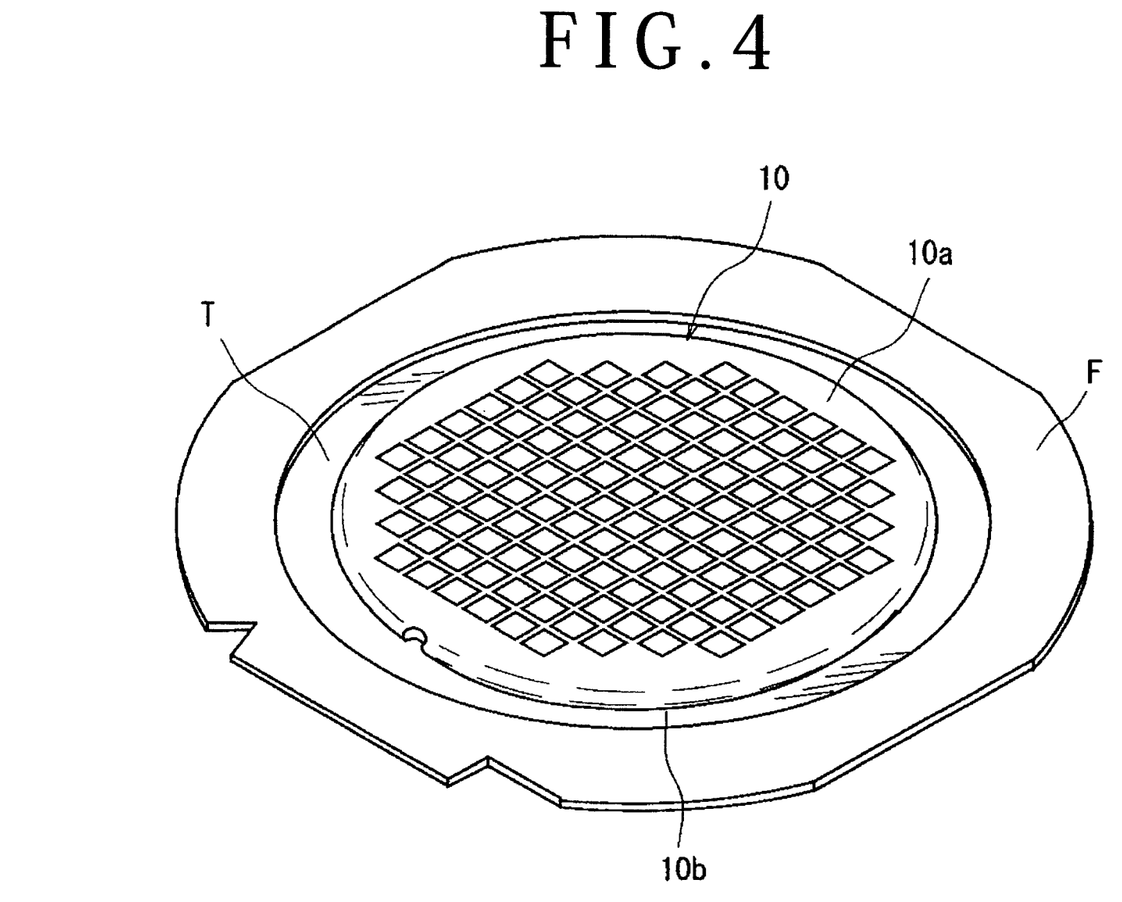
FIG. 4 is a perspective view of the condition where the back-side surface of the semiconductor wafer shown in FIG. 3 is adhered to a protective tape attached to an annular frame.

Now, description will be made of a laser beam machining method in which the semiconductor wafer 10 is irradiated with a laser beam along the streets 11 to form a denatured layer in the inside of the semiconductor wafer 10 along the streets 11. First, the back-side surface 10b of the semiconductor wafer 10 is adhered to a protective tape T composed of a sheet of a synthetic resin such as polyolefin attached to an annular frame F, as shown in FIG. 4. Therefore, the semiconductor wafer 10 has its face-side surface 10a on the upper side.

Of the semiconductor wafer 10 supported on the annular frame F through the protective tape T as shown in FIG. 4, the protective tape T side is mounted on the chuck table 36 of the laser beam machining apparatus shown in FIG. 1. Then, with the suction means operated, the semiconductor wafer 10 is suction held onto the chuck table 36 through the protective tape T. In addition, the annular frame F is fixed by the clamps 362.

The chuck table 36 with the semiconductor wafer 10 suction held thereon as above-mentioned is positioned just under the image pickup means 53 by the machining feeding means 37. When the chuck table 36 is positioned just under the image pickup means 53, an alignment work is carried out for detecting a work region of the semiconductor wafer 10 to be subjected to laser beam machining, by the image pickup means 53 and the control means 6. Specifically, the image pickup means 53 and the control means 6 performs alignment of a laser beam irradiation position by carrying out image processing such as pattern matching for making position matching (registration) between the streets 11 formed in the semiconductor wafer 10 in a predetermined direction and the condenser 524 of the laser beam irradiation means 52 for irradiating the semiconductor wafer 10 with a laser beam along the streets 11. In addition, alignment of the laser beam irradiation position is similarly conducted also for the streets formed in the semiconductor wafer 10 in a direction orthogonal to the predetermined direction.

Figure 5A:
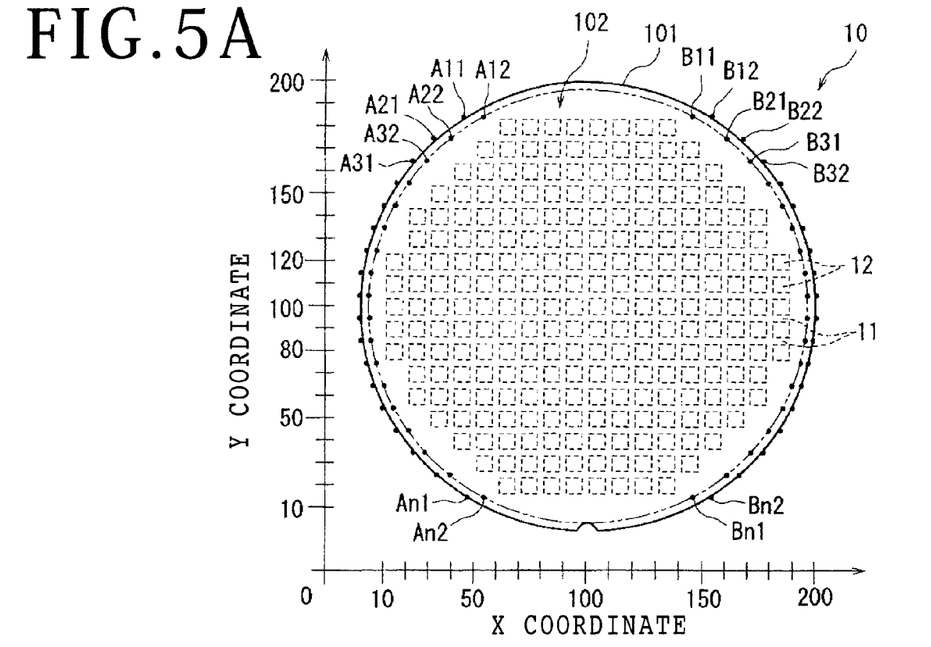
FIGS. 5A and 5B are illustrations of the relationships of the semiconductor wafer shown in FIG. 4 in the state of being held in a predetermined position on a chuck table of the laser beam machining apparatus shown in FIG. 1, with coordinates.
Figure 5B:
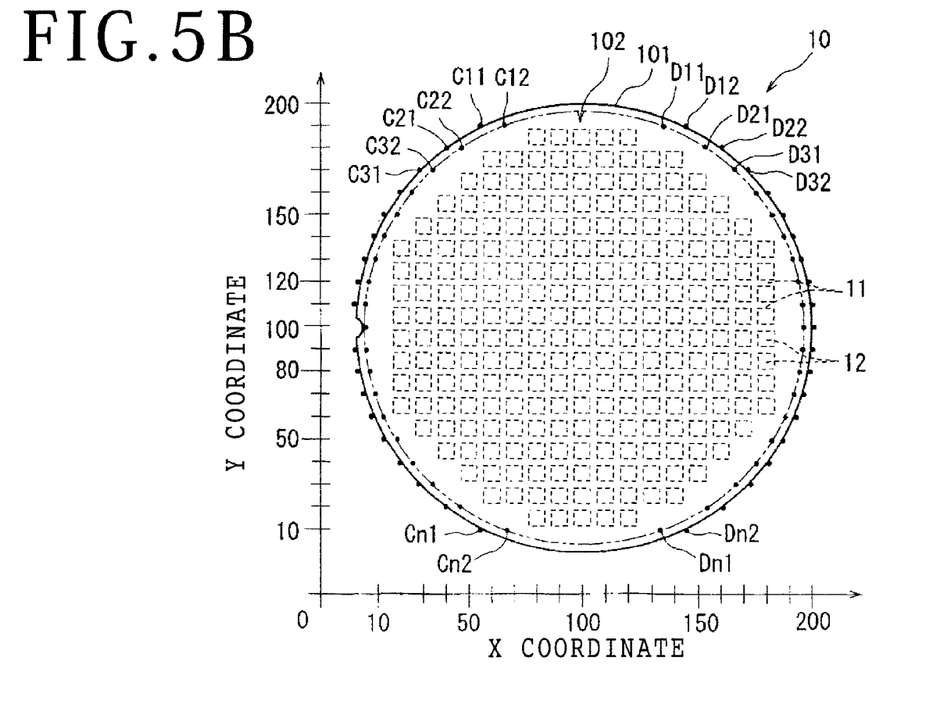

When the alignment is performed as just-mentioned, the semiconductor wafer 10 on the chuck table 36 is in the state of being positioned in a coordinate position shown in FIG. 5A. Incidentally, FIG. 5B shows the condition where the chuck table 36, i.e., the semiconductor wafer 10 has been rotated by 90 degrees from the state shown in FIG. 5A. With respect to those coordinates (A11, A12, B11, B12 to An1, An2, Bn1, Bn2) and (C11, C12, D11, D12 to Cn1, Cn2, Dn1, Dn2) of the streets 11 in the semiconductor wafer 10 positioned into the states shown in FIGS. 5A and 5B which correspond to the outer end and the inner end of the chamfer part 101, design values for the semiconductor wafer 10 are preliminarily stored in the first storage region 63a in the random access memory (RAM).

Figure 6A:
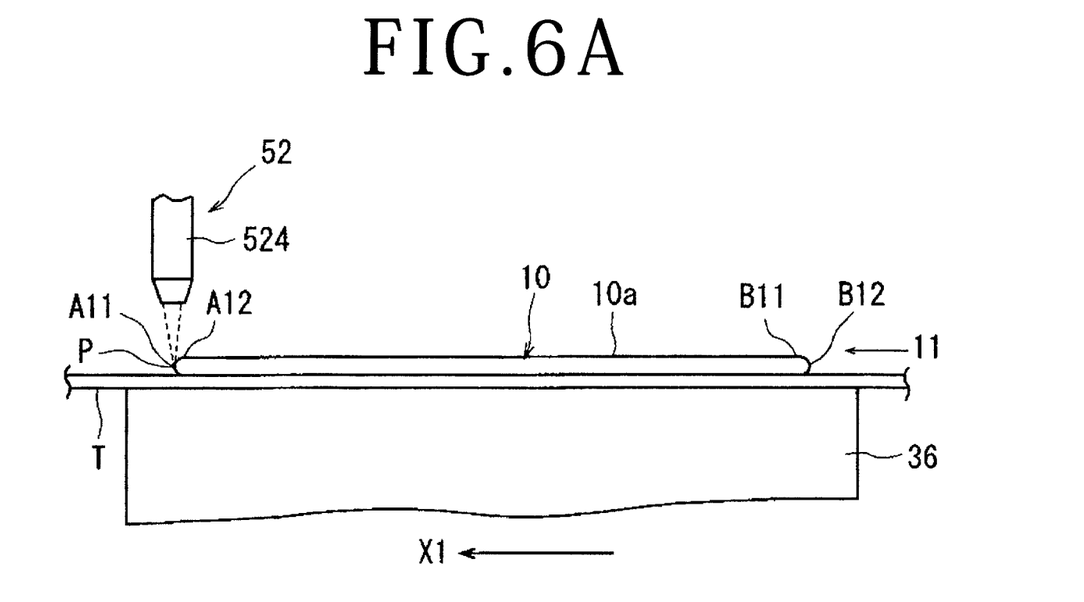
FIGS. 6A and 6B are illustrations of a laser beam irradiation step which is conducted on the semiconductor wafer shown in FIG. 3 by the laser beam machining apparatus shown in FIG. 1.
Figure 6B:
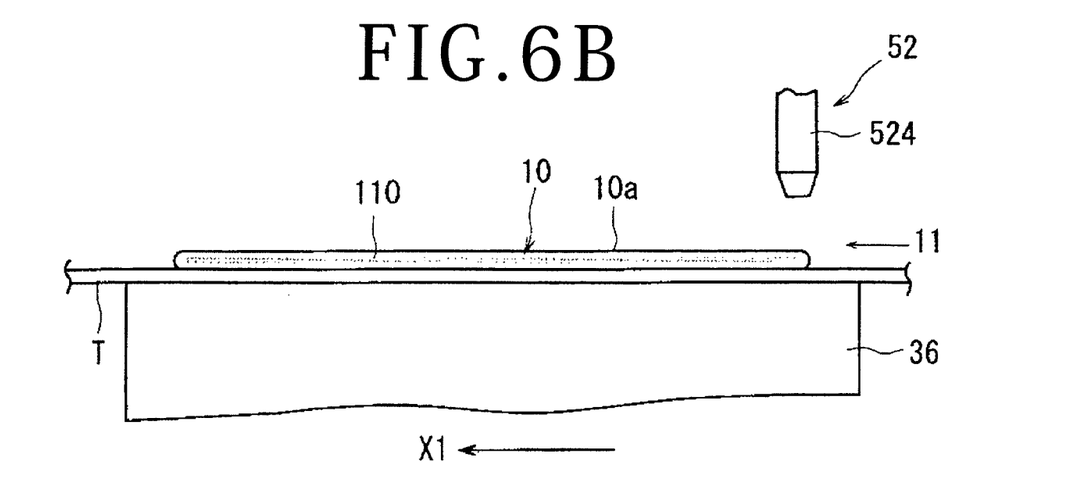

When the alignment step as above is carried out, a wafer positioning step is carried out in which the chuck table 36 is turned to be positioned into the state of FIG. 6A. Specifically, the machining feeding means 37 and the first indexing feeding means 38 are operated to move the chuck table 36 into the work region on the lower side of the condenser 524, whereby the A11 coordinate of the uppermost street in FIG. 5A of the streets 11 formed in the semiconductor wafer 10 is positioned just under the condenser 524 of the laser beam irradiation means 52, as shown in FIG. 6A. Next, the converging point position adjusting means 53 is operated so that the converging point P of the laser beam radiated from the condenser 524 of the laser beam irradiation means 52 is adjusted to a middle part of the thickness of the semiconductor wafer 10. Then, the control means 6 operates the laser beam irradiation means 52 to radiate from the condenser 524 a laser beam with such a wavelength as to be transmitted through the wafer, and, while keeping this irradiation, operates the machining feeding means 37 to move the chuck table 36 in the machining feed direction indicated by arrow X1 at a predetermined feed rate (laser beam irradiation step). In the laser beam irradiation step, the machining conditions for the arcuate chamfer part 101 of the semiconductor wafer 10 and the machining conditions for the flat surface part 102 surrounded by the chamfer part 101 are different from each other, and are set as follows.

(1) Machining Conditions for Flat Surface Part 102
Wavelength of laser beam: 1064 nm
Mean output: 1.2 W
Converging spot diameter: ϕ1 μm
Repetition frequency: 80 kHz
Machining feed rate: 300 mm/sec
(2) Machining Conditions for Chamfer Part 101
Wavelength of laser beam: 1064 nm
Mean output: 1.2 W
Converging spot diameter: ϕ1 μm
Repetition frequency: 1000 kHz
Machining feed rate: 300 mm/sec As above-mentioned, the machining conditions for the flat surface part 102 and the machining conditions for the chamfer part 101 differ only in repetition frequency, and the repetition frequency in machining the chamfer part 101 is set to be not less than 10 times the repetition frequency in machining the flat surface part 102. Specifically, the repetition frequency in machining the chamfer part 101 is set at an extremely high frequency, and, therefore, the energy density per pulse of the pulsed laser beam is so low that the silicon wafer as the work cannot be machined by the energy of the pulsed laser beam.

More specifically, in the case of carrying out the laser beam irradiation step, at the time of radiating the pulsed laser beam from the condenser 524 by operating the laser beam irradiation means 52 from the condition shown in FIG. 6A, the control means 6 performs such a control that the repetition frequency set by the repetition frequency setting means 522b of the laser beam oscillating means 522 is set at 1000 kHz for the part ranging from the A11 coordinates to the A12 coordinates corresponding to the chamfer part 101, that the repetition frequency is set at 80 kHz for the part ranging from the A12 coordinates to the B11 coordinates corresponding to the flat surface part 102, and that the repetition frequency is set at 1000 kHz for the part ranging from the B11 coordinates to the B12 coordinates corresponding to the chamfer part 101. Incidentally, the control means 6 judges the A11 coordinates, the A12 coordinates, the B11 coordinates, and the B12 coordinates on the basis of a detection signal sent from the X-axis direction position detecting means 374. Therefore, for the part ranging from the A11 coordinates to the A12 coordinates and the part ranging from the B11 coordinates to the B12 coordinates which belong to the chamfer part 101, the repetition frequency is as high as 1000 kHz, and the energy density per pulse of the pulsed laser beam is low, so that the semiconductor wafer 10 is not machined. Accordingly, even if the converging point P of the laser beam radiated from the condenser 524 of the laser beam irradiation means 52 is positioned into the vicinity of the surface of the chamfer part 101, ablation machining would not occur and, hence, no debris would be generated. On the other hand, for the part ranging from the A12 coordinates to the B11 coordinates which belongs to the flat surface part 102, the repetition frequency is set at 80 kHz, and the energy density per pulse of the pulsed laser beam is set to a value suitable for forming a denatured layer in the inside of the silicon wafer, so that a denatured layer 110 is formed in the inside of the semiconductor wafer 10 along the street 11.

Incidentally, in the case where the semiconductor wafer 10 is large in thickness, the above-mentioned laser beam irradiation step is carried out a plurality of times while changing the converging point P stepwise, whereby a plurality of denatured layers 110 are formed in a stacked manner. The above-mentioned laser beam irradiation step is carried out along all the streets 11 formed in the semiconductor wafer 10 along a predetermined direction. Next, the chuck table 36, i.e., the semiconductor wafer 10 is turned by 90 degrees, and the above-mentioned laser beam irradiation step is carried out along the streets extending perpendicularly to the streets 11 formed in the semiconductor wafer 10 along the predetermined direction.

Now, another embodiment of the laser beam machining apparatus based on the present invention will be described below. In this embodiment, the machining conditions in the laser beam irradiation step are set as follows.

(1) Machining Conditions for Flat Surface Part 102
Wavelength of laser beam: 1064 nm
Mean output: 1.2 W
Converging spot diameter: ϕ1 μm
Repetition frequency: 80 kHz
Machining feed rate: 300 mm/sec
(2) Machining Conditions for Chamfer Part 101
Wavelength of laser beam: 1064 nm
Mean output: 1.2 W
Converging spot diameter: ϕ1 μm
Continuous wave: Q switch 522c opened
Machining feed rate: 300 mm/sec Specifically, although the machining conditions for the flat surface part 102 are the same as in the above-described embodiment, in machining the chamfer part 101 the control means 6 opens a Q switch 522c of the laser beam irradiation means 522 so that the laser beam oscillated from the laser beam oscillating means 522 is made to be a continuous wave. Therefore, in the flat surface part 102, the denatured layer 110 can be formed in the inside of the semiconductor wafer 10 along the streets 11, in the same manner as in the above-described embodiment. Besides, since the chamfer part 101 is irradiated with the laser beam which is a continuous wave, the energy density is so low that the semiconductor wafer 10 is not machined. Accordingly, even if the converging point P of the laser beam radiated from the condenser 524 of the laser beam irradiation means 52 is positioned into the vicinity of the surface of the chamfer part 101, ablation machining would not occur and, hence, no debris would be generated.

When the denatured layer 110 is formed in the inside of the semiconductor wafer 10 along the streets 11 in the above-mentioned manner, the semiconductor wafer 10 is sent to the subsequent step, i.e., a dividing step. In the dividing step, an external force is exerted on the semiconductor wafer 10 along the streets 11 along which the denatured layer 110 has been formed, whereby the semiconductor wafer 10 is broken along the streets 11, to be divided into individual devices.

The present invention is not limited to the details of the above described preferred embodiments. The scope of the invention is defined by the appended claims and all changes and modifications as fall within the equivalence of the scope of the claims are therefore to be embraced by the invention.

What is claimed is:
1. A laser beam machining apparatus comprising:
a wafer including an arcuate chamfered part formed on an outer periphery of the wafer;
a chuck table for holding said wafer;
laser beam irradiation means for irradiating said wafer held on said chuck table with a laser beam;

machining feeding means for putting said chuck table and said laser beam irradiation means into relative movement in a machining feed direction (X-axis direction);

indexing feeding means for putting said chuck table and said laser beam irradiation means into relative movement in an indexing feed direction (Y-axis direction) orthogonal to said machining feed direction (X-axis direction);

X-axis direction position detecting means for detecting an X-axis direction position of said chuck table;

Y-axis direction position detecting means for detecting a Y-axis direction position of said chuck table; and control means for controlling said laser beam irradiation means, said machining feeding means and said indexing feeding means on the basis of signals from said X-axis direction position detecting means and said Y-axis direction position detecting means, wherein said laser beam irradiation means includes a laser beam oscillator for oscillating a laser beam with such a wavelength as to be transmitted through said wafer, repetition frequency setting means for setting a repetition frequency of pulses in said laser beam oscillated from said laser beam oscillator, and a Q switch for outputting a gate signal to said laser beam oscillator correspondingly to said repetition frequency set by said repetition frequency setting means; and said control means includes a memory for storing coordinates of said arcuate chamfered part formed at an outer periphery of said wafer and coordinates of a flat surface part surrounded by said chamfer part, and automatically controls said repetition frequency setting means so as to set a flat surface repetition frequency and a chamfered part repetition frequency based on said stored coordinates, said X-axis direction position detected by said X-axis direction position detection means, and said Y-axis direction position detected by said Y-axis direction position detecting means;

wherein the flat surface repetition frequency is the frequency of pulses in a laser beam with which to irradiate said flat surface part to a value suitable for machining of said wafer, and the chamfered part repetition frequency is the repetition frequency of pulses in a laser beam with which to irradiate said chamfered part, wherein the chamfered part repetition frequency is set to a value higher than said flat surface repetition frequency.

2. The laser beam machining apparatus as set forth in claim 1, wherein said repetition frequency of said pulsed laser beam with which to irradiate said chamfer part is set to be not less than 10 times said repetition frequency of said pulsed laser beam with which to irradiate said flat surface part.

3. A laser beam machining apparatus comprising:
a wafer including an arcuate chamfered part formed on an outer periphery of the wafer;
a chuck table for holding said wafer;
laser beam irradiation means for irradiating said wafer held on said chuck table with a laser beam;
machining feeding means for putting said chuck table and said laser beam irradiation means into relative movement in a machining feed direction (X-axis direction);
indexing feeding means for putting said chuck table and said laser beam irradiation means into relative movement in an indexing feed direction (Y-axis direction) orthogonal to said machining feed direction (X-axis direction);
X-axis direction position detecting means for detecting an X-axis direction position of said chuck table;
Y-axis direction position detecting means for detecting a Y-axis direction position of said chuck table; and
control means for controlling said laser beam irradiation means, said machining feeding means and said indexing feeding means on the basis of signals from said X-axis direction position detecting means and said Y-axis direction position detecting means, wherein said laser beam irradiation means includes:
a laser beam oscillator for oscillating a laser beam with such a wavelength as to be transmitted through said wafer,
repetition frequency setting means for setting a repetition frequency of pulses in said laser beam oscillated from said laser beam oscillator, and
a Q switch for outputting a gate signal to said laser beam oscillator correspondingly to said repetition frequency set by said repetition frequency setting means; and said control means includes a memory for storing coordinates of a said arcuate chamfered part formed at an outer periphery of said wafer and coordinates of a flat surface part surrounded by said chamfered part, and automatically controls said repetition frequency setting means based on said stored coordinates, said X-axis direction position detected by said X-axis direction position detection means, and said Y-axis direction position detected by said Y-axis direction position detecting means so as to set a repetition frequency of pulses in a laser beam with which to irradiate said flat surface part to a value suitable for machining of said wafer, and opens said Q switch to cause said laser beam oscillated from said laser beam oscillator to be a continuous wave at the time of irradiating said chamfered part with said laser beam.

4. A laser beam machining method comprising:
providing a wafer including an arcuate chamfered part formed on an outer periphery of the wafer and a flat surface part surrounded by said arcuate chamfered part;
storing coordinates of said arcuate chamfered part and said flat surface part
moving said wafer in a machining feed direction (X-axis direction) relative to a laser beam irradiation means;
moving said wafer in an indexing feed direction (Y-axis direction) relative to said laser beam irradiation means, said indexing feed direction being orthogonal to said machining feed direction;
detecting an X-axis direction position of said wafer;
detecting a Y-axis direction position of said wafer;
irradiating said wafer with a pulsed laser beam;
controlling said irradiating step to automatically adjust a frequency of pulses of said pulsed laser beam based on said stored coordinates, said detected X-axis direction position, and said detected Y-axis direction position, so that a flat surface frequency of pulses irradiating said flat surface part is a value suitable for machining said wafer and a chamfered part frequency of pulses irradiating said chamfered part is greater than said flat surface frequency.

* * * * *